US008234153B2

US008234153B2

(12) United States Patent
Hecker et al.

(10) Patent No.: US 8,234,153 B2
(45) Date of Patent: Jul. 31, 2012

(54) AUTOMATED PERFORMANCE APPRAISAL SYSTEM WITH A COMPENSATION SIMULATOR

(75) Inventors: Diana Luise Hecker, Malsch (DE); Caroline Goll, Bretten (DE); Maurice Hendrik Hagen, Walldorf (DE)

(73) Assignee: SAP AG, Walldorf (DE)

( * ) Notice: Subject to any disclaimer, the term of this patent is extended or adjusted under 35 U.S.C. 154(b) by 837 days.

(21) Appl. No.: 12/267,877

(22) Filed: Nov. 10, 2008

(65) Prior Publication Data

US 2010/0076821 A1    Mar. 25, 2010

Related U.S. Application Data

(60) Provisional application No. 61/099,386, filed on Sep. 23, 2008.

(51) Int. Cl.
*G06F 15/02* (2006.01)
(52) U.S. Cl. ...................................... 705/7.32
(58) Field of Classification Search .................. 705/7.32
See application file for complete search history.

(56) References Cited

U.S. PATENT DOCUMENTS

| | | | | |
|---|---|---|---|---|
| 5,819,231 | A * | 10/1998 | Tremaine | 705/7.21 |
| 2003/0204423 | A1* | 10/2003 | Koller et al. | 705/7 |
| 2004/0098306 | A1* | 5/2004 | Fitzpatrick et al. | 705/14 |
| 2006/0229890 | A1* | 10/2006 | Sattler et al. | 705/1 |
| 2007/0260513 | A1* | 11/2007 | Pavlov | 705/14 |
| 2008/0019500 | A1* | 1/2008 | Torres et al. | 379/265.02 |

OTHER PUBLICATIONS

Munter, Paul; Kren, Leslie ; The impact of uncertainty and monitoring by the board of directors on incentive system design 1995 ;ISSN: 0268-6902 Journal Code: MAJ ;Document Type: Journal article Language: English Length: 12; Pages Managerial Auditing Journal v10n4 pp. 23-34.*

* cited by examiner

*Primary Examiner* — Lynda Jasmin
*Assistant Examiner* — Luis Santiago
(74) *Attorney, Agent, or Firm* — Kenyon & Kenyon LLP

(57) ABSTRACT

A performance appraisal system is provided for reviewing employees' performance of a company. The performance appraisal system may be integrated with a compensation simulator such that compensation for each employee may be associated with his/her respective performance. On a computer graphical user interface, employees in an organizational unit of the company may be shown in a grid pane displaying a variety of performance tiers. The employees may be distributed among the performance tiers based on performance appraisals. In response to an employee change performance tier, for example, an employee may be dragged from one performance tier and dropped in a different performance tier, the system automatically makes corresponding changes to respective performance appraisals. The integrated compensation simulator simulates adjustments to compensations for affected employees based on changes to performance appraisals. Alternatively, the system may list employees in a table and the table may contain a number of sections corresponding to a number of performance tiers. In response to an employee change from one section to an adjacent section, for example, caused by an adjustment of a section, the employee may be changed from one performance tier to another performance tier.

23 Claims, 6 Drawing Sheets

AUTOMATED PERFORMANCE APPRAISAL SYSTEM WITH A COMPENSATION SIMULATOR

RELATED APPLICATIONS

This application is a non-provisional of U.S. Application No. 61/099,386 filed Sep. 23, 2008 (pending), the contents of which are incorporated herein by reference.

FIELD OF THE INVENTION

The present invention relates generally to computer-supported human resource management and, more specifically, to associating employee compensations with employee appraisals.

BACKGROUND

Employees are perhaps the most valuable asset of a company. However, keeping and attracting valuable employees often requires that the company compensates employees adequately. Many companies hold employee review meetings at least once a year to review/evaluate employees. An employee appraisal may be based on performance but may also focus on other areas, such as: talent, potential to grow, collegiality, etc.

To normalize their review processes, companies may set organizational expectations to drive some of the employee review/evaluation processes. For example, a company may estimate that a fixed percentage of employees are likely to have an appraisal score "meet expectations," another fixed percentage to "exceed expectations," and yet another percentage to be "below expectations." These scores may set expectations regarding compensation. For example, an employee that exceeds expectation may expect higher compensation than someone who is not performing well.

Managers often evaluate employees within a business unit of a company and give appraisal scores. The manager may adjust appraisals for employees based on a variety of factors, such as: personal reflection of an employee's performance, peer-reviews, extraordinarily good deeds, etc. However, a manager may not be authorized to adjust the employee's compensation when the manager adjusts employee appraisals. For example, the compensation may be handled by a HR department and may be based on a job title, educational background, seniority, etc.

There may be other constraints that limit possible adjustment of compensations. For example, there may be a fixed budget for employee compensation within the business unit. In addition, reviews of employee appraisals are typically performed by managers in isolation, so reviews may not be accurate. Also, the information that can be relevant to determining employee compensation may not be available for people making compensation adjustment. Accordingly, there is a need in the art for improved systems and methods for associating employee compensations with employee appraisals.

DETAILED DESCRIPTION

Figure 1:
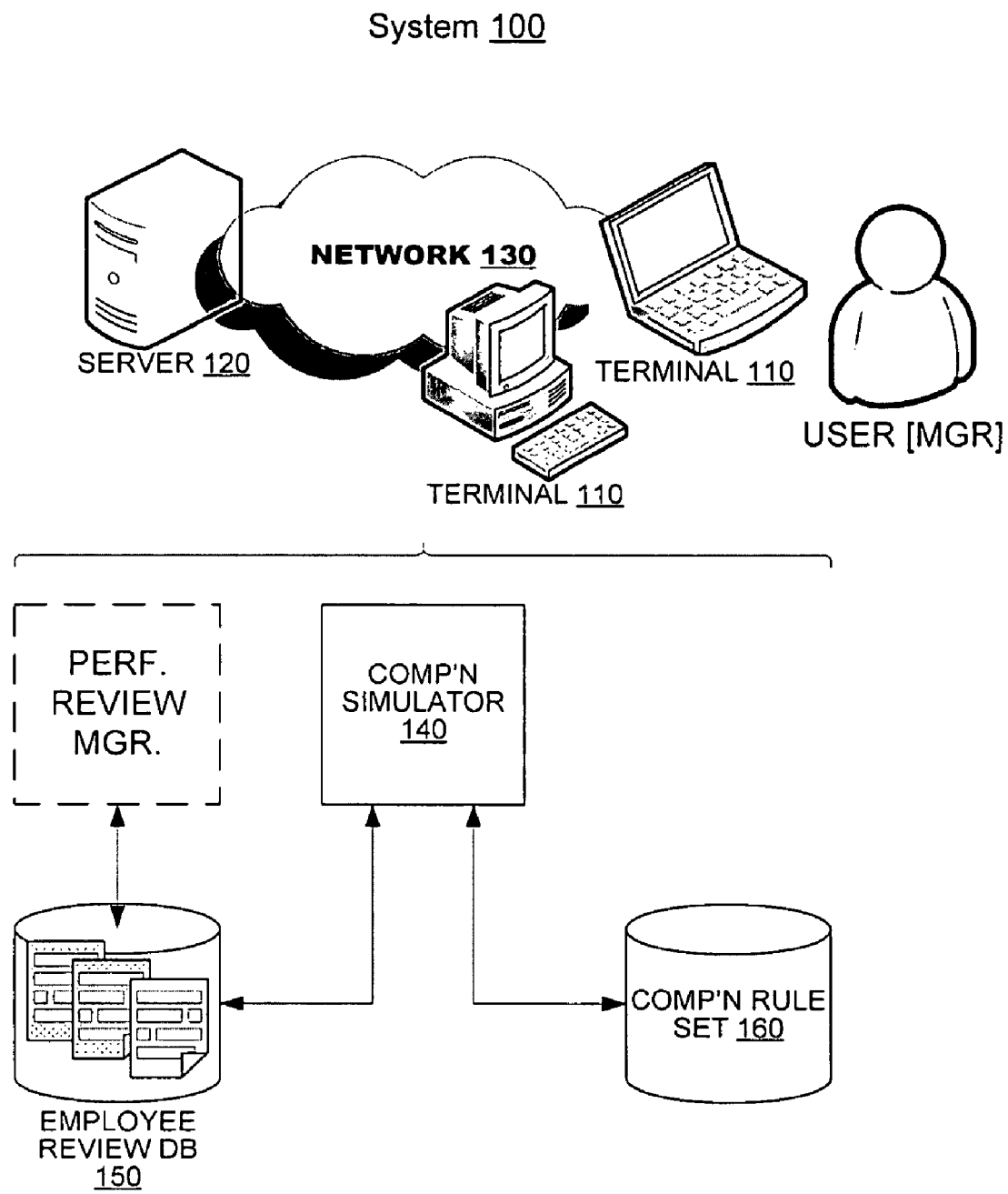
FIG. 1 illustrates a system block diagram in accordance with an exemplary embodiment of the present invention.

Embodiments of the present invention provides tools to permit managers to normalize review data of employees who report to them and to simulate changes in the employees' compensation to accommodate for comparative review data. In so doing, these tools aid managers in their goal to provide objective reviews to their employees and to review their employees in a manner that allows the managers to assess the value provided by each employee on a comparative basis.

The tools may include an "appraisal grid," and a compensation simulation pane. The appraisal grid may be provided in a first pane of a display. The appraisal grid may display a plurality of performance tiers and place each employee within a common corporate group into a performance tier based on the employee's individual performance appraisal. A manager may review the appraisal grid and evaluate the performance appraisals of multiple employees on a comparative basis. If the manager believes that a given employee's review is unduly generous or unduly harsh, the manager may interact with the appraisal grid to move the employee to a more appropriate performance tier (e.g., via a drag-and-drop operation). The manager's action may be recorded in the employee's performance appraisal document for subsequent processing.

The compensation simulation pane may be provided in a second pane of the display. The compensation simulation pane may display compensation for each employee under review and simulate compensation changes that are likely to be awarded to each employee based on the performance appraisal. The simulation pane may display the simulated compensation in a manner that differentiates prior compensation from compensation changes that may be awarded based on the new performance appraisal. Additionally, the simulation pane may display the simulated compensation as compared to an average compensation of all members of the corporate group. Alternatively, the simulation pane may display the simulated compensation as compared to an average compensation available to members of the group as determined, for example, by budget allocations for the group. As noted above, managers may re-assign employees among performance tiers. When this occurs, the compensation simulator may adjust simulated compensation automatically according to compensation guidelines.

In one exemplary embodiment, rather than display employees in an appraisal grid, the first pane may show employees in a table. The employees may be listed in the table by a certain order (e.g., ascending or descending according to performance appraisal scores). Different performance tiers may be designated by dividing lines displayed among employees listed within the table. In a table display of the employees, drag-and-drop operation may be performed on an employee as well. Moreover, the dividing lines that separate adjacent performance tiers may be moved such that employees close to the boundaries may change performance tier after a boundary adjustment. In a further aspect of the exemplary embodiment, compensation for affected employees may be adjusted automatically, manually, or both. Moreover, the second pane may also show employee compensation in a table. Sometimes, a filter may be applied to the compensation table to only show employees with compensation being adjusted.

FIG. 1 illustrates a system block diagram in accordance with an exemplary embodiment of the present invention. The automated performance appraisal system with a compensation simulator may be performed by a computer system 100 that may include one or more terminals 110. The terminals 110 may provide a point of interface between a user (typically, a manager) and the performance appraisal system. The computer system 100 may further include one or more servers 120 that execute software applications that act as the performance appraisal system. The terminals 110 and servers 120 may be provided in communication with each other by a network 130. Each of the terminals 110 and servers 120 may use programmable processor(s), memory, and/or I/O devices. Each of the terminals 110 and servers 120 may be connected to a machine-readable medium, where instructions for the software applications may be stored. Unless noted otherwise herein, the architecture and topology of the network (including the numbers of terminals and/or servers) is immaterial to the present discussion.

The system 100 may further include a compensation simulator 140, an employee review database 150, and a compensation rule set 160 executed by the servers 120 and/or terminals 110. The employee review database 150 may store data files representing: employee performance appraisals from which the compensation simulator develops its initial view of group performance; organizational structure identifying employees that are members of a common organizational group; and employee managers that are authorized to generate, review and manipulate employee appraisals. The compensation rule set 160 may store data defining rules for adjusting employee compensation based on data in the employee's appraisal. Further, the various software components described above may be distributed among terminals 110 and servers 120. The architecture and topology of the software components is immaterial to the present discussion. The software modules including program instructions can be stored on computer readable media such as discs, including CD and DVD, flash memory, hard drives including magnetic and optical drives, or any other suitable computer readable media, and that will cause a computer or processor to execute the program instructions. The software language used to write the software modules can be any that is suitable for implementing the described exemplary embodiments, and are known to those of skill in the art.

The system 100 may operate in conjunction with other system components. For example, a tool for entering performance appraisal data may be provided to group managers. Thus, a performance appraisal manager may populate the employee review database 150 with review data before operation of the compensation simulator 140.

Figure 2:
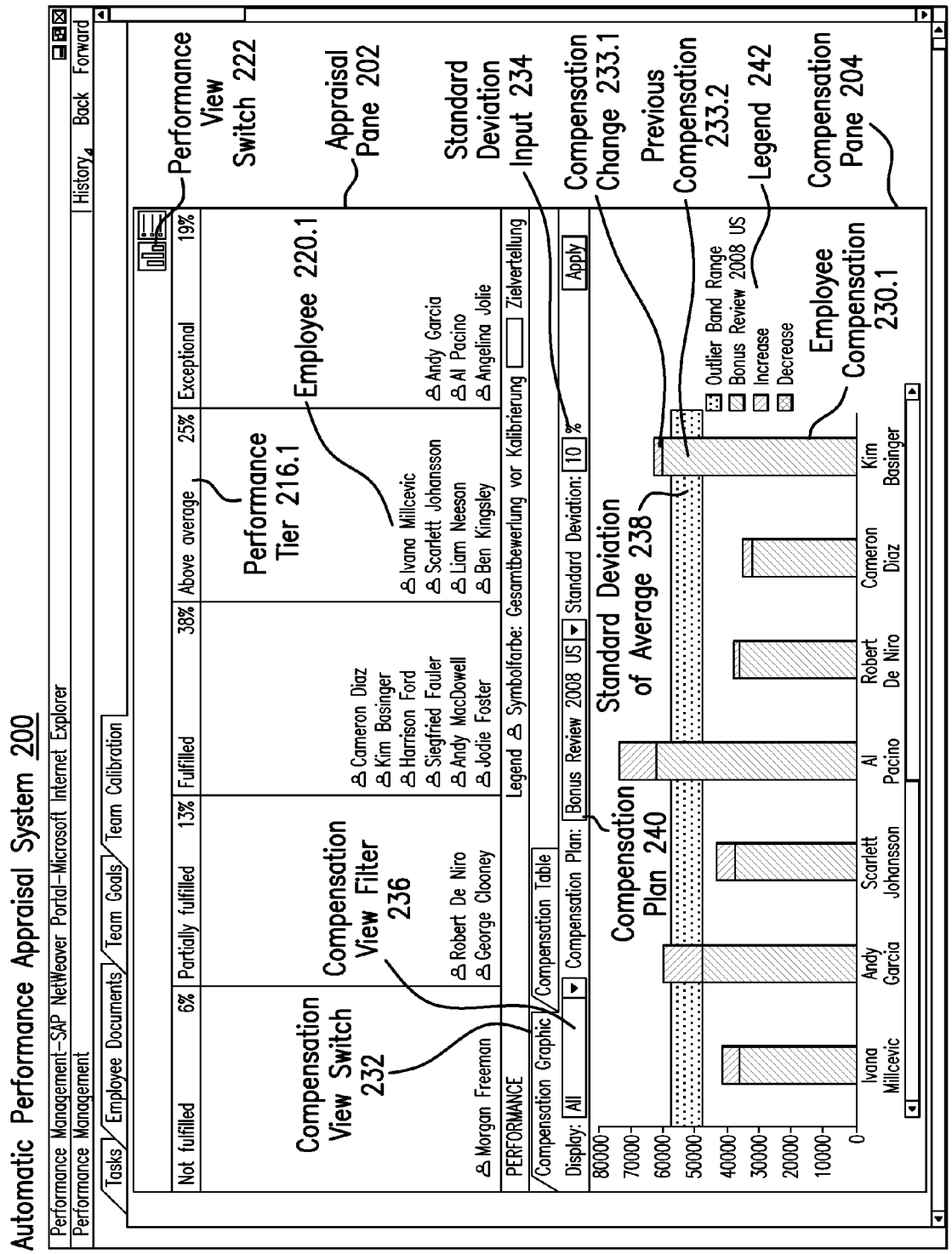
FIG. 2 illustrates one display of an automated performance appraisal system with a compensation simulator according to an embodiment of the present invention.

FIG. 2 illustrates an automated performance appraisal system 200 according to an embodiment of the present invention. The system 200 may be an automated performance appraisal system with a compensation simulator. The system 200 may include an appraisal pane 202 and a compensation pane 204. When the performance appraisal system 200 is first opened, the appraisal pane 202 may be populated by retrieving stored performance appraisal data of the group members and displaying them in performance tiers according to those ratings. For example, the appraisal pane 202 may display a plurality of employees in a plurality of performance tiers, such as Employee 220.1 shown in a Performance Tier 216.1. Each performance tier may display a percentage for employees in the respective performance tier (e.g., 30% of employees are in a "Fulfilled" performance tier.) By classifying employees into different performance tiers, the system 200 may provide a comparative process to facilitate review of performance appraisals.

The system 200 may facilitate a review process and provide functionalities to reevaluate performance appraisals. In one exemplary embodiment, a manager may reassign employees among the performance tiers by direct interaction with the display (e.g., drag and drop). Further, the manager may save changes, which are recorded in employee's appraisal documents.

The appraisal pane 202 may include a Performance View Switch 222. In one exemplary embodiment, in responsive to a user interaction, the appraisal pane 202 may switch from a grid pane as shown in FIG. 2 to another display (e.g., a list pane as shown in FIG. 43).

The compensation pane 204 may display simulated compensation changes for employees, such as a Employee Compensation 230.1. For example, a simulation of compensation changes may be performed in accordance with rules from a rule set (e.g., rule set 160). The compensation pane 204 may show simulated compensation changes for all employees in a predetermined corporate group according to performance appraisals as shown in the appraisal pane 202. The Employee Compensation 230.1 may include two portions: a Compensation Change portion 233.1 and a Previous Compensation portion 233.2. The Previous Compensation 233.2 may be shown as a bottom portion representing compensation of a previous plan period (e.g., current salary, or past bonus). The Compensation Change 233.1 may be shown as a top portion indicating a compensation change that would be induced by the employee review. In one or more exemplary embodiments, the top portion may be shown in a color and/or shade different from the bottom portion, thus providing a visual differentiation between the two portions. The compensation change may be determined by compensation plans adopted by respective companies. For example, compensation plans may include salary, bonus, stock options, retirement contributions, etc. In an embodiment, the compensation change may be implemented as increases in bonus, salary, or both. In another embodiment, The compensation change may be a decrease as determined by the employee review. In one embodiment, the compensation change may comprise adjustment to the compensation plans. For example, a company may have a compensation plan that includes a comprehensive list of benefits, one of which may be a long term incentive plan. The long term incentive plan may include administering awards, such as stock options (e.g., incentive stock options, non-qualifying stock options). Adjustment of the compensation plan may include adjustment to vesting schedules of the long term incentive plan.

The compensation pane 204 may include a Compensation Plan Selector 240. The Compensation Plan Selector 240 may be an input control, such as, a drop down list box. In one or more exemplary embodiments, a list of compensation plans may be provided to a user, such that the user may select a compensation plan to display.

The compensation pane 204 may also include a visual indicator of a Standard Deviation of Average 238. The Standard Deviation of Average 238 may show an average compensation of all members of the group and a standard deviation from the average compensation. In one exemplary embodiment, the Standard Deviation of Average 238 may be a horizontal band in a user preferred shade and/or color. Employee compensations, such as the Employee Compensation 230.1, may be displayed in a different color/shade to contrast to the average compensation and standard deviation thereof.

The compensation pane 204 may include a Compensation View Filter Selector 236. The Compensation View Filter Selector 236 may provide a filtering criteria that selects employees to be displayed in the compensation pane 204 (e.g., all employees, employees with changes).

The compensation pane 204 may include a Standard Deviation Input 234. A standard deviation for the average compensation may be applied to contrast the employee compensations. In one exemplary embodiment, not only a user may enter a standard deviation for the average compensation, in addition, a default of 10% may be specified.

Figure 3:
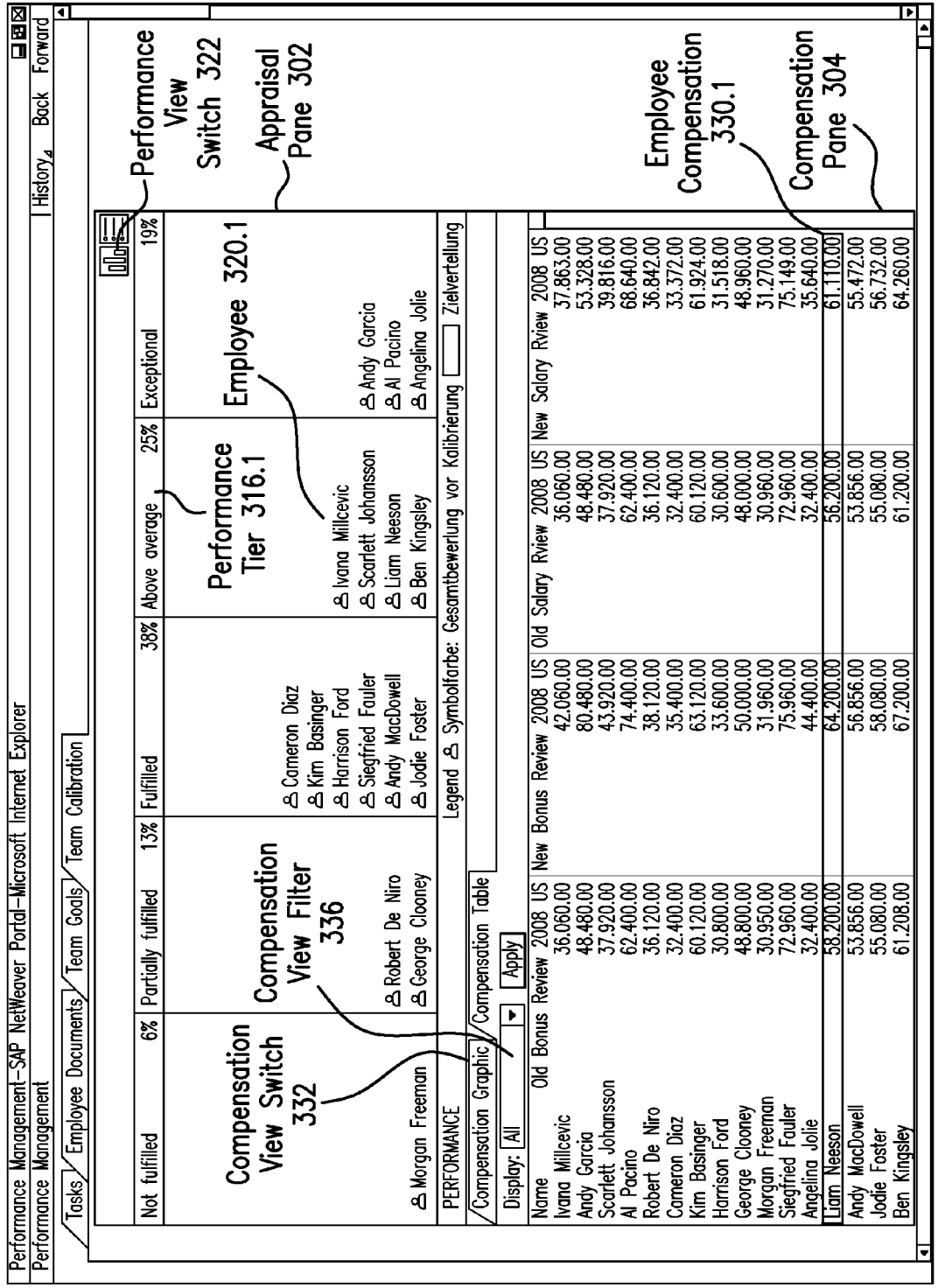
FIG. 3 illustrates another display of an automated performance appraisal system with a compensation simulator according to an embodiment of the present invention.

The compensation pane 204 may include a Compensation View Switch 232, that in response to a user interaction, may switch the compensation pane 204 from a grid pane (e.g., a bar chart) as shown in FIG. 2 to another display (e.g., a list pane as shown in FIG. 3).

The compensation pane 204 may also include a Legend 242. The Legend 242 may display legends for the appraisal pane 202 and/or compensation pane 204 to help a user to understand what a color and/or shade represents in the display. In one exemplary embodiment, the compensation page 204 may show visual effects (e.g., colorful bands) to represent ideal compensation of people with like-kind experience and seniority and compare actual compensation with the ideal compensation.

In one or more exemplary embodiments, an employee's performance appraisal may be adjusted by a manager or a HR administrator. For example, when the performance appraisal system 200 is opened, it may identify employees to be displayed in the appraisal pane 202. Those employees may be determined by a user-entered identifier of a corporate group or the identifier of the user who is using the system. The system 200 may review organizational data to identify employees that are members of the group (or employees to be reviewed by a manager). Then, the system 200 may retrieve performance appraisal data from a review database (e.g., the review database 150 as shown in FIG. 1) and display the various employees in the appraisal pane 202 according to their overall appraisal scores.

The system 200 may provide functions to facilitate reassigning employees among the displayed performance tiers. For example, drag-and-drop operations may be provided such that an employee may be dragged from one performance tier to another performance tier. Thus, in FIG. 2, for example, in response to a user action, Employee 220.1 may be moved from the Performance Tier 216.1 to an adjacent performance tier to the left or to the right. In response to the re-assignment, the system 200 may automatically adjust overall performance appraisal for the affected employee (e.g., adjusting overall performance appraisal for Employee 220.1 after he/she has been drag-and-dropped to another adjacent performance tier). The user may save the performance appraisal in the review database when completed. Although in the above example, the Employee 220.1 may be moved to an adjacent performance tier, in one or more exemplary embodiments of the present invention, any employee may be moved to any other performance tier by the manager or HR administrator.

In response to adjustment of an employee's performance appraisal, the system 200 may recalculate the simulated compensation for the affected employee (e.g. adjust compensation for Employee 220.1). In one exemplary embodiment, adjustment of compensation for an affected employee may be based on a guideline. For example, the company may have adopted a set of rules for employee compensation. A guideline may be a rule selected from a stored rule set (e.g., the compensation rule set 160 as shown in FIG. 1), which permits automatic calculation of compensation changes based on a variety of factors, including performance. In at least one exemplary embodiment, the calculated compensation changes may be overwritten manually by the operator of the system 200, if needed.

In one or more exemplary embodiments, the system 200 may simulate both salary increases and/or bonuses. Different views for compensations may be provided, such as: salary increases, or bonuses, or hybrid with both salary increases and bonuses. In one exemplary embodiment, the stored rule set may also include rules that the adjustment for one or more employees may be based on a budget for an organizational unit to which a manager may belong. The budget constraint may provide a useful comparative tool similar to a gray band representing average compensation. For example, an average compensation based on the budge constraint may be displayed, thus adjustment of an employee's appraisal may reflect simulated adjustment to the employee's compensation relative to the average compensation based on the budget constraint. Also, a total compensation may be calculated and compared with the budge constraint. Thus, a manager may adjust employee appraisals and not worrying about budget constraint.

In one or more exemplary embodiments, the drag-and-drop operation may be performed on select employees. For example, upon reviewing the compensation with regard to other employees, the average compensation and in comparison of performance appraisals with regard to other employees, a manager performing review using system 200 may compare performance appraisals of all employees in a group and identify select employees whose reviews seem inappropriate when compared to their colleague (e.g., some initial performance appraisals may be unfair when compared to their counterparts). The manager may determine that some employees have overall performance appraisals which put these employees close to an adjacent performance tier. The manager may move those employees to the adjacent performance tier. In one exemplary embodiment, corporations may set expectations regarding the distribution of employee performance appraisals that are likely to occur (e.g., 30% of group members are average, 10% are exceptional, etc.). Such distribution expectations may be stored by the computer system and displayed in the appraisal pane in a manner that compares the actual distribution to the expectations. The manager may adjust select employees to match the overall employee performance appraisal distribution to the distribution expectations.

In one exemplary embodiment, the system 200 may provide user interface events. For example, in response to a mouse moving over an employee displayed in the Appraisal Pane 202 or an employee compensation displayed in the Compensation Pane 204, a popup window may be displayed (e.g., the Employee Popup 554.1 shown in FIG. 5). Details of the popup window will be described later with respect to FIG. 5.

In one or more exemplary embodiments, all changes effected by the operations performed by a manager may be saved when the current session is saved. Saving a current session may cause automatic updates to performance appraisals and compensation information for affected employees in respective appraisal documents and records in the system. Although the present discussion presents the invention as used in performance appraisal of a company's employees, the principles of the present invention can apply to any appraisals that may adjust compensation according to an overall appraisal score (e.g., sales commissions for business partners, potentials for employee future earnings).

In one or more exemplary embodiments, the system 200 may be implemented in a plurality of modules. For example, the system 200 may comprise a first module for displaying the employees in the performance tiers in the appraisal grid 202. Further, the system 200 may comprise a second module for displaying employee compensations in the compensation pane 204. In addition, the system 200 may comprise a third module for responding to a selection of an employee and a drag-and-drop operation by moving the employee from a current performance tier to a new performance tier and a fourth module for simulating adjustment of employee compensation for the affected employee.

FIG. 3 illustrates an automatic performance appraisal system 300 according to another embodiment of the present invention. The system 300 may include an appraisal pane 302 and a compensation pane 304. The appraisal pane 302 may include a Performance View Switch 322, a Performance Tier 316.1 and an exemplary employee 320.1. The appraisal pane 302 may contain similar features as described above with respect to the appraisal pane 202 of FIG. 2. The compensation pane 304 may display employee compensations, such as a Employee Compensation 330.1, in a list display. The Employee Compensation 330.1 may contain compensation information such as: old bonus review for a previous plan period, old salary review for a previous plan period, new bonus review for a current plan period, new salary review for a current plan period, etc. The compensation pane 304 may include a Compensation View Filter Selector 336 and a Compensation View Switch 332. The Compensation View Filter Selector 336 and the Compensation View Switch 332 may be similar to the Compensation View Filter Selector 236 and the Compensation View Switch 232 described above with respect to FIG. 2.

In one or more exemplary embodiments, operation of the FIG. 3 embodiment strongly resembles operation of the FIG. 2 embodiment. For example, in response to adjustment of overall performance appraisal for an employee, the system 300 may recalculate a simulated compensation for the affected employees (e.g., adjust compensation for the Employee 320.1) and update the changes in the compensation pane 304.

In this embodiment, employees may be displayed in an order based on a total compensation associated with each employee respectively. This embodiment may compare each employee's compensation to an average compensation. For example, different colors or shades may be used, such as: using one highlight color to mark employees within a standard deviation range of the average compensation, using a different color to mark employees above the standard deviation range of the average compensation, and using yet another color to mark employees under the standard deviation range of the average compensation.

Figure 4:
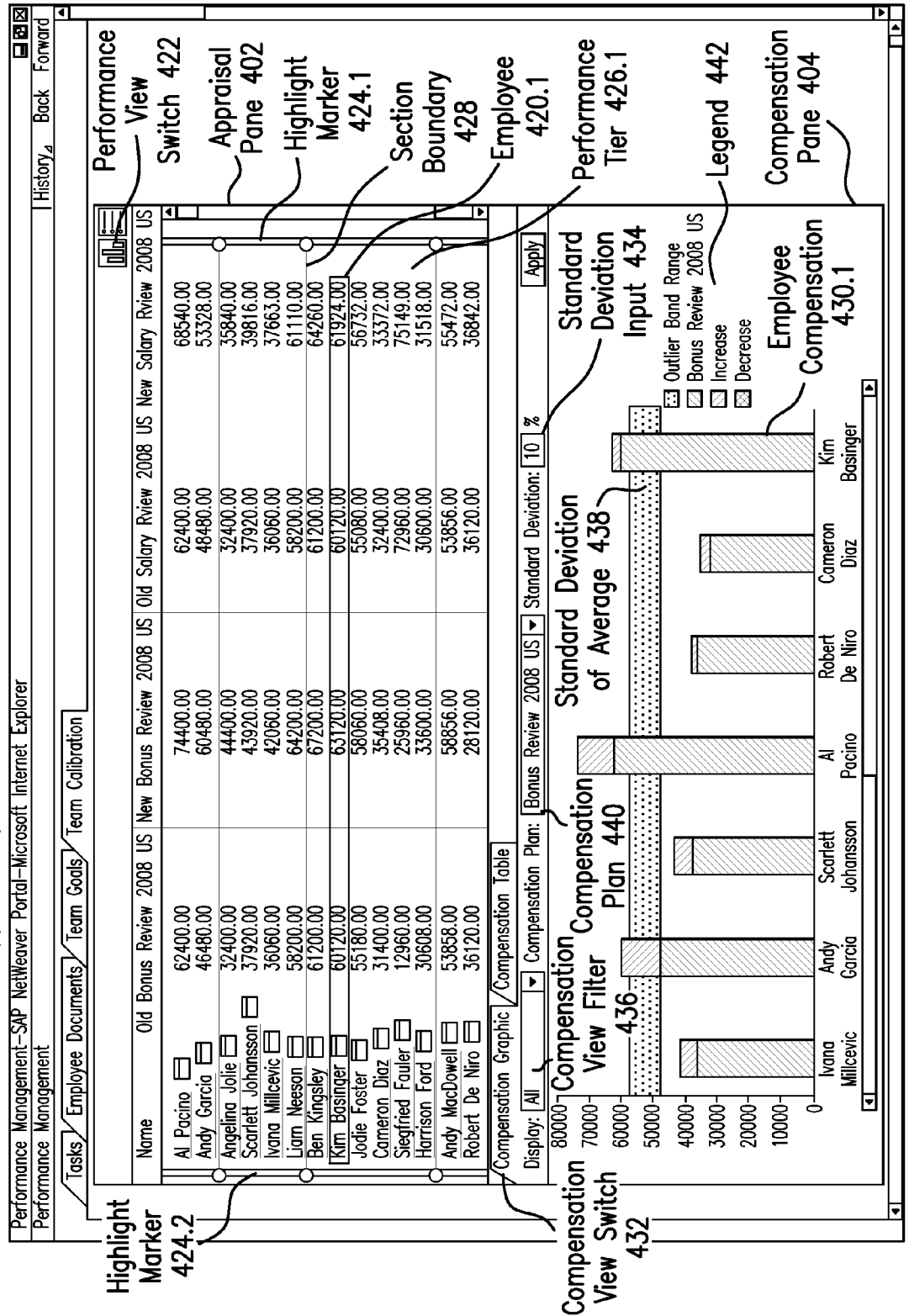
FIG. 4 illustrates another display of an automated performance appraisal system with a compensation simulator according to an embodiment of the present invention.

FIG. 4 illustrates a display of an automated performance appraisal system 400 with a compensation simulator according to an embodiment of the present invention. The system 400 may include an appraisal pane 402 and a compensation pane 404. The appraisal pane 402 may list a plurality of employees in a table. The table may contain a plurality of performance tiers and each employee may be contained within a performance tier, such as a Employee 420.1 is shown in a Performance Tier 426.1. In one exemplary embodiment, each performance tier may be marked by a pair of Highlight Markers 424.1 and 424.2 shown by both sides of the table.

The Employee 420.1 may contain compensation information. For example, the compensation information may contain old bonus review for a previous plan period, old salary review for a previous plan period, new bonus review for a current plan period, new salary review for a current plan period, etc. The appraisal pane 402 may include a Performance View Switch 422. The Performance View Switch 422 may accept a user interaction to switch the appraisal pane 402 from a list pane as shown in FIG. 4 to another display (e.g., a grid pane as shown in FIG. 2).

The compensation pane 404 may be similar to the compensation pane 204 shown in FIG. 2 and contain similar features, such as: a Compensation View Switch 432, a Standard Deviation Input 434, a Compensation View Filter Selector 436, a Legend 442, a Compensation Plan Selector 440, and a Standard Deviation of Average 438. The compensation pane 404 may also contain a display of employee compensations, such as an Employee Compensation 430.1, which may be similar to the Employee Compensation 230.1 shown in FIG. 2. All these features shown in the compensation pane 404 may provide similar functions as described above with respect to FIG. 2.

The system 400 may provide all operations described above with respect to FIG. 2 for adjusting an employee's performance appraisal (e.g., drag-and-drop operations for employees). In addition, in one or more exemplary embodiments, each performance tier may be separated from an adjacent performance tier by a dividing line (e.g., a Section Boundary 428). The system 400 may further provide adjustment of employee performance appraisal by adjusting dividing lines between performance tiers. For example, in response to a user action, the Section Boundary 428 may be moved downward, thus, effectively change Employee 420.1 into another performance tier—the section immediately above Performance Tier 426.1.

Figure 5:
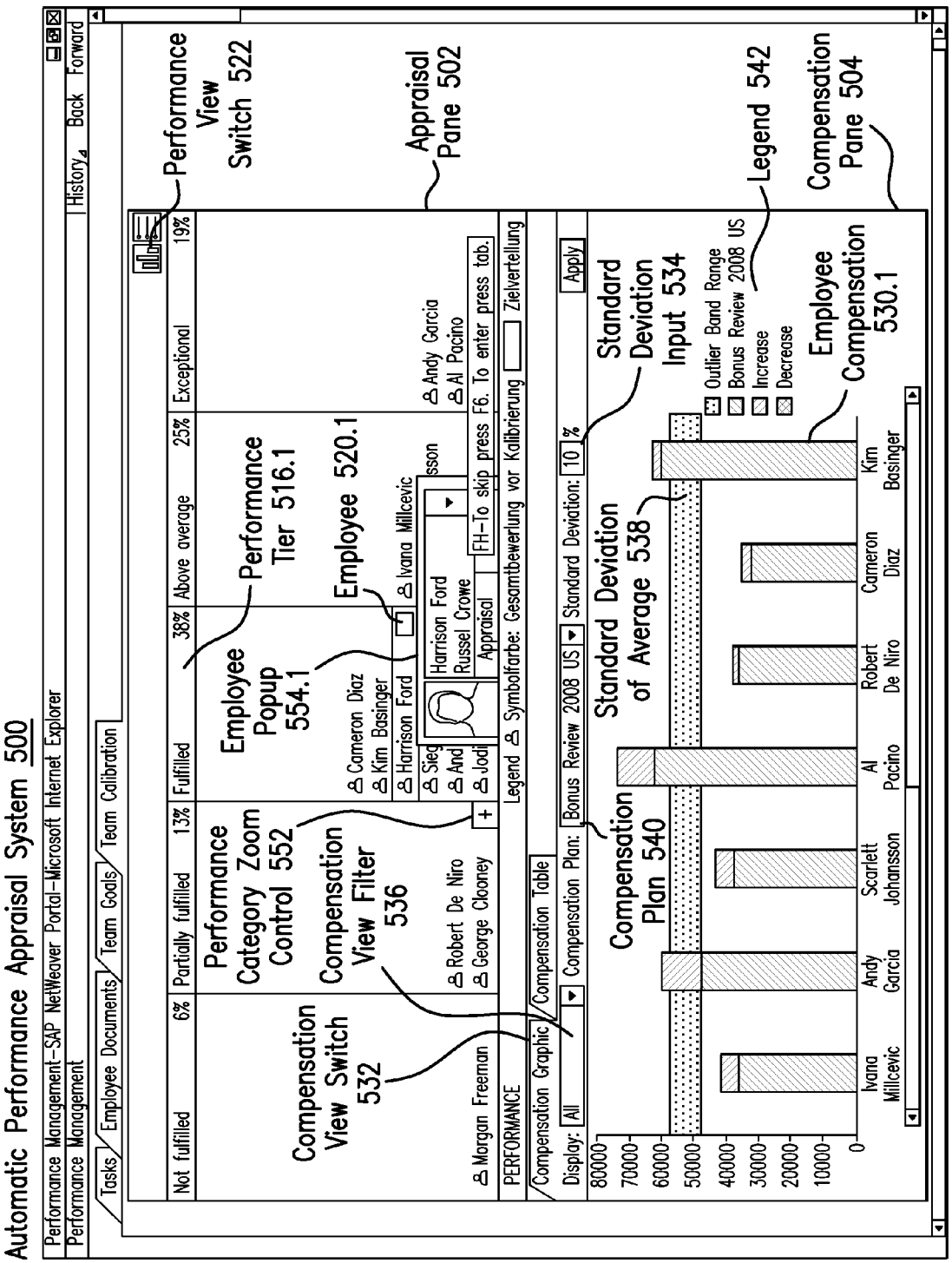
FIG. 5 illustrates another display of an automated performance appraisal system with a compensation simulator according to an embodiment of the present invention.

FIG. 5 illustrates one display of an automated performance appraisal system 500 with a compensation simulator according to an embodiment of the present invention. The system 500 may include an appraisal pane 502 and a compensation pane 504. The appraisal pane 502 may include and display all elements shown in the Compensation pane 204 of FIG. 2. The appraisal pane 502 may further include a popup window for an employee in response to a predetermined event with respect to the employee (e.g., a mouse over event, a mouse right click event). In one exemplary embodiment, in response to a mouse moves over Employee 520.1, the system 500 may display an Employee Popup 554.1.

In one exemplary embodiment, the Employee Popup 554.1 may include a picture of the Employee 520.1. The Employee Popup 554.1 may include other user interface controls that may receive user input. For example, a drop down box may be provided such that when activated, a push button may be displayed. The push button may launch and open a respective employee appraisal document for the Employee 520.1.

The appraisal pane 502 may further include performance tier zoom controls. For example, when the Performance Tier 516.1 becomes active (e.g., mouse click inside an area/context for the performance tier, an employee inside the performance tier is being selected), a Performance Tier Zoom Control 552 may become available. In response to activating the Performance Tier Zoom Control 552, the system 500 may change the display of appraisal pane 502 into a detailed display for the Performance Tier 516.1 (shown in FIG. 6).

The compensation pane 504 may include and show all elements as shown for the Compensation pane 204 with respect to FIG. 2. Those elements of the compensation pane 504 may have similar functions as described above with respect to FIG. 2.

In one or more exemplary embodiments, popup windows similar to Employee Popup 554.1 may also be available in responsive to a mouse moving over employee compensations displayed in compensation pane 504. The content for a popup window with regard to the Compensation Pane 504 may be similar to Employee Popup 554.1 (e.g., showing a picture of the Employee, a control to open the employee's appraisal document). In an exemplary embodiment, the content for a popup window with regard to the Compensation Pane 504 may be different from the Employee Popup 554.1 (e.g., showing a summary of compensation information).

Figure 6:
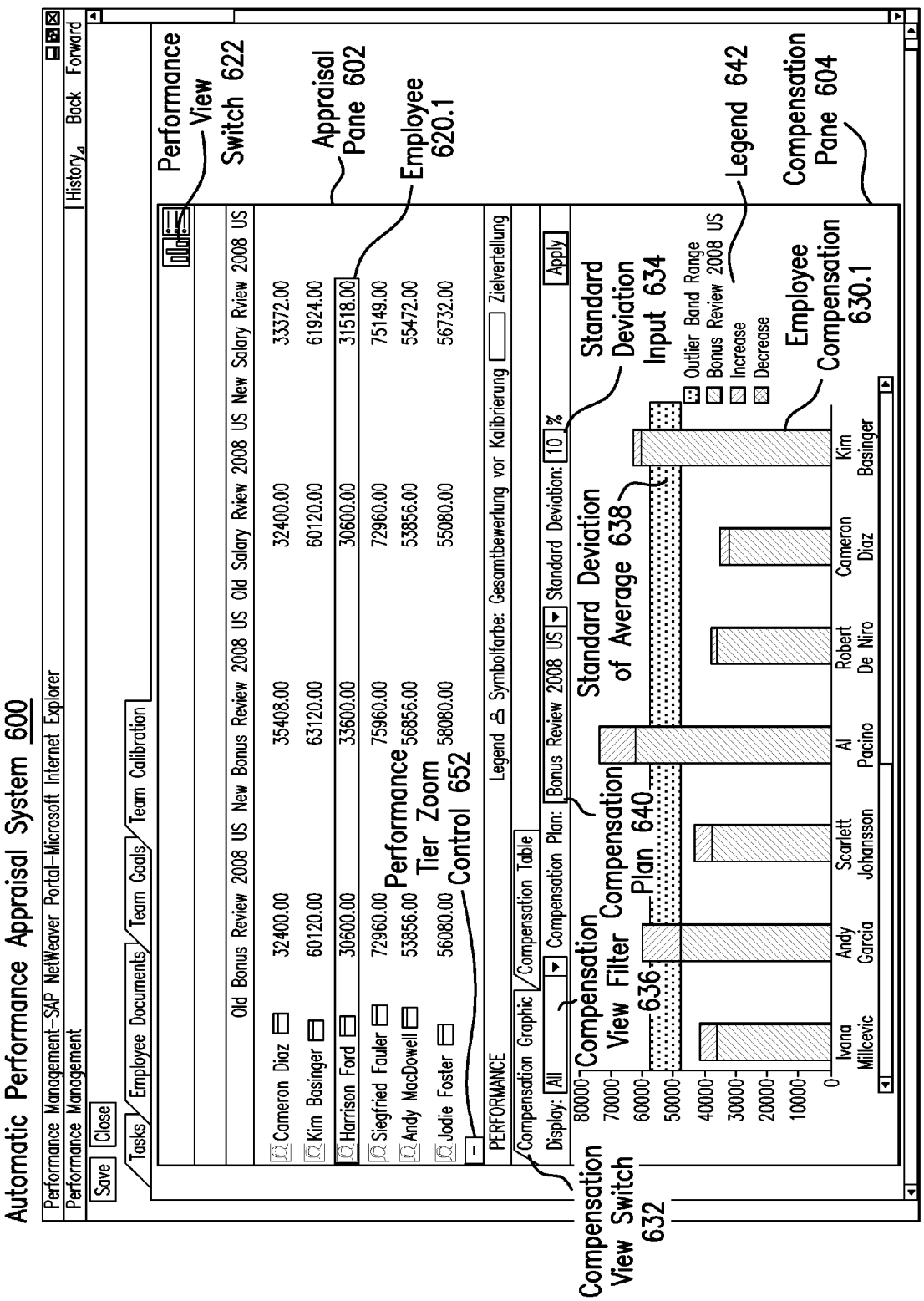
FIG. 6 illustrates another display of an automated performance appraisal system with a compensation simulator according to an embodiment of the present invention.

FIG. 6 illustrates one display of an automated performance appraisal system 600 with a compensation simulator according to an embodiment of the present invention. The system 600 may include an appraisal pane 602 and a compensation pane 604. The appraisal pane 602 may display a detailed view of a performance tier. The detailed view may include a plurality of employees in one performance tier, such as Employee 620.1 in a respective performance tier. Employee 620.1 may contain a picture of the Employee 620.1, compensation information such as: old bonus review for a previous plan period, old salary review for a previous plan period, new bonus review for a current plan period, new salary review for a current plan period, etc. The appraisal pane 602 may have a Performance View Switch 622 so that a user can switch a current detailed view of a performance tier to a grid view such as the appraisal pane 202 shown in FIG. 2 or a table view such as the appraisal pane 402 shown in FIG. 4.

The appraisal pane 602 may also include a performance tier zoom control (e.g., a Performance Tier Zoom Control 652.) The Performance Tier Zoom Control 652 may enable the system 600 to change the appraisal pane's display. For example, in response to a user interaction with regard to the Performance Tier Zoom Control 652, the system 600 may change the appraisal pane's display from a detailed display for one performance tier into a grid display with multiple performance tiers, such as the appraisal pane 502 shown in FIG. 5.

The compensation pane 604 may include and show all elements as shown for the Compensation pane 204 with respect to FIG. 2. Those elements of the compensation pane 604 may have similar functions as described above with respect to FIG. 2.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A computer implemented method for reviewing performance appraisals comprising:
retrieving, by a computer processor, stored appraisal data of a plurality of selected individuals;
simulating, by the computer processor, compensation changes for the selected individuals by applying the individuals' review data to a stored rule set;
displaying, by the computer processor, indicators representing the individuals in a tiered display and the simulated compensation changes to a reviewing user, wherein the tiered display includes a plurality of tiers corresponding to different levels of personnel performance, and each indicator is displayed in one tier according to a respective individual's appraisal data;
moving, by the computer processor, an indicator from one tier to a second tier according to user input;
re-simulating, by the computer processor, compensation changes for an individual associated with the moved indicator according to revised appraisal data corresponding to the second tier, and
displaying, by the computer processor, the moved indictor in the second tier and the re-simulated compensation changes to the user.

2. The method of claim 1, wherein the indicators are displayed in a table display wherein multiple tiers are shown in different sections of the table, the user input is a drag and move operation performed on a table demarking line separating two performance tiers to move the indicator across the moved table demarking line.

3. The method of claim 1, wherein: the tiered display of indicators is provided in a first display pane, and the simulated compensation changes are displayed in a second display pane displayed simultaneously with the first display pane.

4. The method of claim 3, further comprising:
calculating an average compensation for the select group of individuals; and
displaying, in the second pane, a visual representation to indicate a standard deviation from the average compensation, wherein the first pane shows a grid display and each performance tier is shown in a respective column.

5. The method of claim 4, wherein the individuals are employees of a company, the user action is a selection of an employee and a drag-and-drop operation moving the employee from a current performance tier to a new performance tier.

6. The method of claim 4, further comprising:
responsive to a selection of one column in the first pane as an active column, displaying a control such that the active column is to be displayed in detail when the control is activated.

7. The method of claim 4, wherein the second pane shows a grid display and the visual representation is a horizontal band.

8. The method of claim 4, wherein the second pane shows a table display and the visual effect shows individuals with compensation within the standard deviation in a different color.

9. The method of claim 4, wherein the visual representation indicates distribution of individual's compensation with regard to the average compensation.

10. The method of claim 1, wherein adjusting compensation is performed by applying a guideline.

11. The method of claim 1, wherein adjusting compensation comprises recording increased salary, a bonus, or both for an individual.

12. The method of claim 1, wherein adjusting compensation is an adjustment to a compensation plan.

13. A non-transitory computer readable medium embodied with instructions for a method for reviewing performance of individuals, the instructions causing a computer to execute the method, comprising:
retrieving stored appraisal data of a plurality of selected individuals;
simulating compensation changes for the selected individuals by applying the individuals' appraisal data to a stored rule set;

displaying, in a first pane, to a reviewing user indicators representing the selected individuals in a tiered display, wherein the tiered display includes a plurality of tiers corresponding to different levels of personnel performance, and each indicator is displayed in one tier according to a respective individual's appraisal data;

moving an indicator from one tier to a second tier according to user input;

revising appraisal data of the individual corresponding to the moved indicator and storing the revised appraisal data;

re-simulating compensation changes for the individual corresponding to the moved indicator according to revised appraisal data corresponding to the second tier, and displaying the moved indicator in the second tier and re-simulated compensation changes to the reviewing user.

14. The computer readable medium of claim 13, displaying, in a second pane, simulated compensation for each of the individuals respectively, wherein the simulated compensation for each individual changes as a user moves the individuals among the tiers.

15. The computer readable medium of claim 13, wherein the first pane shows a grid display and each group is shown in a respective column.

16. The computer readable medium of claim 15, wherein the individuals are employees of a company and the method further comprising: responsive to a selection of an employee and a drag-and-drop operation moving the employee from a current column to a new column, adjusting an associated overall appraisal result for the employee; and adjusting an associated compensation for the employee.

17. The computer readable medium of claim 16, wherein the method further comprising:
calculating an average compensation for the plurality of employees;
displaying, in the second pane, a visual effect to indicate a standard deviation of a specified amount from the average compensation, wherein the visual effect indicates distribution of employees' compensation with regard to the average compensation.

18. The computer readable medium of claim 17, wherein the second pane shows a grid display and the visual effect is a horizontal bar.

19. The computer readable medium of claim 17, wherein the second pane shows a table display and the visual effect shows employees with compensation within the standard deviation in a different color.

20. The computer readable medium of claim 19, wherein the first pane shows a table display and each group is shown in different sections of the table, the method further comprising:
responsive to a drag operation with regard to a division line between two adjacent sections, adjusting associated overall appraisal results for affected employees by the drag operation of the division line; and adjusting compensation for the affected employees.

21. The computer readable medium of claim 20, wherein adjusting compensation is performed by applying a guideline and compensation adjustment is achieved by adjusting salary, giving a bonus, or both.

22. The computer readable medium of claim 20, wherein adjusting compensation is performed by applying a guideline and compensation adjustment is achieved by adjusting a compensation plan.

23. A system for reviewing individual appraisals and associating compensation to the individual appraisals, comprising:
a display device for displaying a graphical user interface; and
a processor connected to the display device and configured to receive inputs from the graphical user interface, the processor is adapted to execute instructions comprising:
retrieving, by a computer processor, stored appraisal data of a plurality of selected individuals;
simulating, by the computer processor, compensation changes for the selected individuals by applying the individuals appraisal data to a stored rule set;
displaying, in a first pane, identifiers representing the plurality of individuals in a plurality of tiers, wherein the plurality of tiers corresponding to different levels of personnel performance, and each identifier is displayed in one tier according to a respective individual's appraisal data,
displaying, in a second pane, simulated compensation for each of the individuals respectively
moving an identifier of an individual from one tier to a second tier according to input from a reviewing user;
re-simulating compensation changes for the individual associated with the moved identifier according to revised appraisal data corresponding to the second tier, and
displaying the moved identifier in the second tier and the re-simulated compensation changes to the reviewing user.

* * * * *